United States Patent Office 3,072,590
Patented Jan. 8, 1963

3,072,590
AQUEOUS POLYMERIZATION OF FLUORINATED MONOMER IN THE PRESENCE OF HALOGENATED AROMATIC COMPOUNDS
Douglas A. Rausch, Midland, Mich., assignor to The Dow Chemical Company, Midland, Mich., a corporation of Delaware
No Drawing. Filed Feb. 4, 1960, Ser. No. 6,613
5 Claims. (Cl. 260—29.6)

This invention relates to an improved method for the preparation of latexes of polyfluoroolefins. More particularly, it relates to a method of producing such latexes which are characterized by a high degree of mechanical stability, small particle size and high solids content.

The emulsion polymerization of completely halogenated fluoroolefins, such as tetrafluoroethylene and chlorotrifluoroethylene, is attended by certain difficulties, chief of which is the fact that the resulting latex is ordinarily extremely unstable. This is particularly true when an attempt is made to prepare a latex of high solids content. Accordingly, it is usually necessary to maintain the ratio of the continuous aqueous phase to the disperse phase at an impractically high value. Attempts to prepare latexes of suitably high solids content by the usual techniques employing conventional dispersing agents invariably result in the production of materials that coagulate with extreme ease, or, at best, are pasty in consistency and of large particle size.

The difficulties encountered in the emulsion polymerization of fluoroolefins have been met, in part, by the use of highly fluorinated perhaloalkanoic acids as emulsifying agents. These materials, however, are difficult and expensive to prepare and their use does not permit the attaining of as high a solids content as is frequently desired. Furthermore, in latexes made with these fluorinated emulsifying agents, the average particle size of the dispersed phase is undesirably high.

It is, therefore, a principal object of the present invention to provide a method of emulsion polymerization of completely halogenated fluoroolefins, and of mixture of such completely halogenated fluoroolefins with other monomers copolymerizable therewith, whereby a stable latex of desirably high solids content may be produced. Another object of the invention is to provide a method of producing such a latex in which the disperse phase is in the form of extremely small particles. Still another object is to provide a means of controlling the particle size of the described latex. Other and related objects will be evident from the description following.

According to the present invention, the above and related objects are attained by conducting the emulsion polymerization in the presence of a small but effective amount of certain readily available aryl halides and substituted aryl halides. Specifically, the aryl halide is one of the group consisting of orthodichlorobenzene and 2,5-dichlorobenzotrifluoride.

These materials are particularly useful in the preparation of latexes of chlorotrifluoroethylene polymers and of copolymers of chlorotrifluoroethylene with vinylidene fluoride. As above indicated, they are simply added to the mixture of water, monomer, dispersing agent and catalyst before emulsification and polymerization are carried out in the known manner. Advantageously, these useful aryl halides are employed in an amount equal to from about 1.0 percent by weight to about 10.0 percent, based on the weight of monomeric material. The amount to be employed is a matter of choice, inasmuch as it has been determined that control of particle size may be obtained by regulating the amount of the aryl halide. That is, the particle size of the latex obtained increases with decreasing content of these modifying materials.

The latexes resulting from the use of these modifying agents in the emulsification polymerization of fluoroolefins are stable materials well adapted to the formation of continuous films. In general, it will be found, when orthodichlorobenzene is employed, that the modifying agent will separate from the latex on standing and may readily be removed therefrom without impairing the stability of the latex. The 2,5-dichlorobenzotrifluoride, on the other hand, usually remains incorporated in the latex.

The invention is illustrated by the following examples which are intended to be merely demonstrative and not limiting and wherein all parts and percentages are on a weight basis.

EXAMPLE 1

A mixture of 50 parts of oxygen-free distilled water, 0.3 part of sodium bisulfite, 0.015 part of ferrous sulfate heptahydrate and 2 parts of perfluorooctanoic acid was adjusted to a pH of 3.0. This mixture was then charged into a bottle containing 2.0 parts of 2,5-dichlorobenzotrifluoride and the contents of the bottle were frozen. One part of potassium persulfate and 20 parts of chlorotrifluoroethylene were added, and the bottle was tightly sealed. The bottle was then agitated for 20 hours in a constant temperature bath maintained at 25° C. There was formed a stable, fluid latex having a solids content of 28 percent in which the average particle size was about 0.05 micron.

EXAMPLE 2

Example 1 was repeated except for the fact that only 0.5 part of 2,5-dichlorobenzotrifluoride was employed. A stable, fluid latex was obtained which had an average particle size of 0.1 micron and which contained 28 percent of solids.

EXAMPLE 3

With the omission of 2,5-dichlorobenzotrifluoride, the experiment described in Example 1 was repeated. No latex was obtained; the polymer separated as a completely coagulated mass.

EXAMPLE 4

The experiment described in Example 1 was repeated with the 2,5-dichlorobenzotrifluoride omitted and the amount of perfluorooctanoic acid increased from 2.0 to 4.0 parts. A thick, pasty latex was obtained, the average particle size of which exceeded 0.3 micron.

EXAMPLE 5

Example 1 was repeated with 2.0 parts of orthodichlorobenzene replacing the 2,5-dichlorobenzotrifluoride. A latex was obtained comparable to that of Example 1 in regard to particle size and stability.

EXAMPLE 6

Example 2 was repeated with 0.5 part of orthodichlorobenzene replacing the 2,5-dichlorobenzotrifluoride. A stable latex was obtained which had an average particle size of 0.1 micron.

EXAMPLE 7

A mixture of 100 parts of distilled, oxygen-free water, 0.5 part of sodium bisulfite, 0.05 part of ferrous sulfate heptahydrate and 4.0 parts of perfluorooctanoic acid was adjusted to a pH of 3.0. This mixture was then charged into a stainless steel pressure vessel. Six parts of 2,5-dichlorobenzotrifluoride were added and the contents of the vessel were frozen. The air was then evacuated therefrom. One and one half parts of potassium persulfate dissolved in 20 parts of distilled water was then charged into the vessel. The contents were again frozen and the vessel was re-evacuated. Chlorotrifluoroethylene (CTFE) and vinylidene fluoride (VF$_2$) were then distilled into the vessel in a ratio of 80 mols of the former to 20 mols of the latter. The vessel was sealed and placed in a water bath where it was agitated at 20° C. for 20 hours. A stable, fluid latex resulted which had an average particle size of 0.05 micron. When cast onto cellophane the latex gave, when dried, a clear continuous coating.

EXAMPLE 8

Example 7 was repeated with the substitution of 4.0 parts of orthodichlorobenzene for the 6 parts of 2,5-dichlorobenzotrifluoride. A stable, fluid latex was obtained which had an average particle size of about 0.5 micron.

EXAMPLE 9

Following the method of Example 7, latexes were prepared from several monomer mixtures of varying compositions. The compositions employed are indicated in Table I, below.

Table I

| | Mol Ratio, $CTFE/VF_2$ | 2,5-dichlorobenzotrifluoride as percent of monomer | Solids Percent | Observation |
|---|---|---|---|---|
| (2) | 80/20 | 4.0 | 48 | Stable, fluid, latex. |
| (1) | 81/19 | 0.0 | 49 | Coagulation. |
| (4) | 89/11 | 4.0 | 31 | Stable, fluid, latex. |
| (5) | 89/11 | 4.0 | 48 | Do. |
| (3) | 84/16 | 4.0 | 48 | Do. |
| (6) | 62/38 | 4.0 | 37 | Do. |

What is claimed is:

1. In the process of aqueous emulsion polymerization of a polymerizable material selected from the group consisting of chlorotrifluoroethylene and mixtures of chlorotrifluoroethylene and vinylidene fluoride, in which process a perfluoroalkanoic acid is employed as the emulsifying agent, the improvement in which from about 1 percent to about 10 percent by weight, based on the weight of polymerizable material, of a dichlorobenzene compound selected from the group consisting of orthodichlorobenzene and 2,5-dichlorobenzotrifluoride is present in the reaction mixture.

2. In the process of aqueous emulsion polymerization of a polymerizable material selected from the group consisting of chlorotrifluoroethylene and mixtures of chlorotrifluoroethylene and vinylidene fluoride, in which process a perfluoroalkanoic acid is employed as the emulsifying agent, the improvement in which from about 1 percent to about 10 percent by weight, based on the weight of polymerizable material, of orthodichlorobenzene is present in the reaction mixture.

3. In the process of aqueous emulsion polymerization of a polymerizable material selected from the group consisting of chlorotrifluoroethylene and mixtures of chlorotrifluoroethylene and vinylidene fluoride, in which process a perfluoroalkanoic acid is employed as the emulsifying agent, the improvement in which from about 1 percent to about 10 percent by weight, based on the weight of polymerizable material, of 2,5-dichlorobenzotrifluoride is present in the reaction mixture.

4. In the process of aqueous emulsion polymerization of chlorotrifluoroethylene, in which process a perfluoroalkanoic acid is employed as the emulsifying agent, the improvement in which from about 1 percent to about 10 percent by weight, based on the weight of chlorotrifluoroethylene, of 2,5-dichlorobenzotrifluoride is present in the reaction mixture.

5. In the process of aqueous emulsion polymerization of a polymerizable mixture of chlorotrifluoroethylene and vinylidene fluoride, in which process a perfluoroalkanoic acid is employed as the emulsifying agent, the improvement in which from about 1 percent to about 10 percent by weight, based on the weight of the polymerizable mixture, of 2,5-dichlorobenzotrifluoride is present in the reaction mixture.

References Cited in the file of this patent

UNITED STATES PATENTS

| 2,559,752 | Berry | July 10, 1951 |
| 2,612,484 | Bankoff | Sept. 30, 1952 |
| 2,662,065 | Berry | Dec. 3, 1953 |
| 2,816,082 | Brinker et al. | Dec. 10, 1957 |
| 2,965,595 | Brinker et al. | Dec. 20, 1960 |

OTHER REFERENCES

Booth et al.: J.A.C.S., volume 57, 1935, pages 2066–9.